United States Patent Office 3,567,606
Patented Mar. 2, 1971

3,567,606
RADIATION INDUCED GRAFT
COPOLYMERIZATION
Sharda Das Gupta and James Theodore Slobodian, Ottawa, Ontario, Canada, assignors to Atomic Energy of Canada Limited, Ottawa, Ontario, Canada
No Drawing. Continuation of application Ser. No. 338,625, Jan. 20, 1964. This application Jan. 8, 1968, Ser. No. 696,483
Claims priority, application Canada, July 24, 1963, 880,898
Int. Cl. B01j 1/10, 1/12
U.S. Cl. 204—159.12      17 Claims

ABSTRACT OF THE DISCLOSURE

In the process of graft polymerization by the use of high energy radiation the improvements comprising covering the material to be grafted with an outer layer wherein homopolymerization is minimized in the inner layer by the presence of said outside layer.

---

This is a continuation of U.S. patent application Ser. No. 338,625, filed Jan. 20, 1964, now abandoned.

The present invention relates to the radiation induced graft copolymerization of monomers and linear shaped articles of natural and synthetic polymeric materials such as fabrics, filaments, threads, sheets and webs.

The present invention relates more particularly to the radiation induced graft copolymerization of vinyl monomers such as styrene, and methylmethacrylate to linear shaped articles of natural and synthetic polymeric materials which are capable of being formed into a porous roll, such as fabrics, filaments and threads of polymers such as nylon and cellulose and sheets of paper.

Throughout this specification high energy ionizing radiation is given in a unit of adsorbed radiation dose called the "rad." The rad is defined as an absorbed dose of 100 ergs of energy per gram of absorbing material.

Grafting of monomers on to articles made of polymeric materials such as nylon and cellulose has resulted in considerable improvement in the properties of the resultant articles. Such properties as resistance to water and chemicals, water impermeability of fabrics, tensile strength, wet and dry crease recovery and resistance to weathering, have all been greatly improved.

In the process of treating polymeric materials in the form of sheets, filaments or threads, a certain amount of homopolymerization of the monomer is encountered and this generally necessitates a separate step for the removal of the homopolymers formed.

For example, if styrene is irradiated alone it undergoes homopolymerization to yield polystyrene. However, if styrene is irradiated in the presence of nylon it has been found that in addition to homopolymerization, styrene molecules will attach themselves on to the nylon molecules to form a copolymer which in this particular case will be a graft copolymer. Possible courses for the reactions are believed to be as follows:

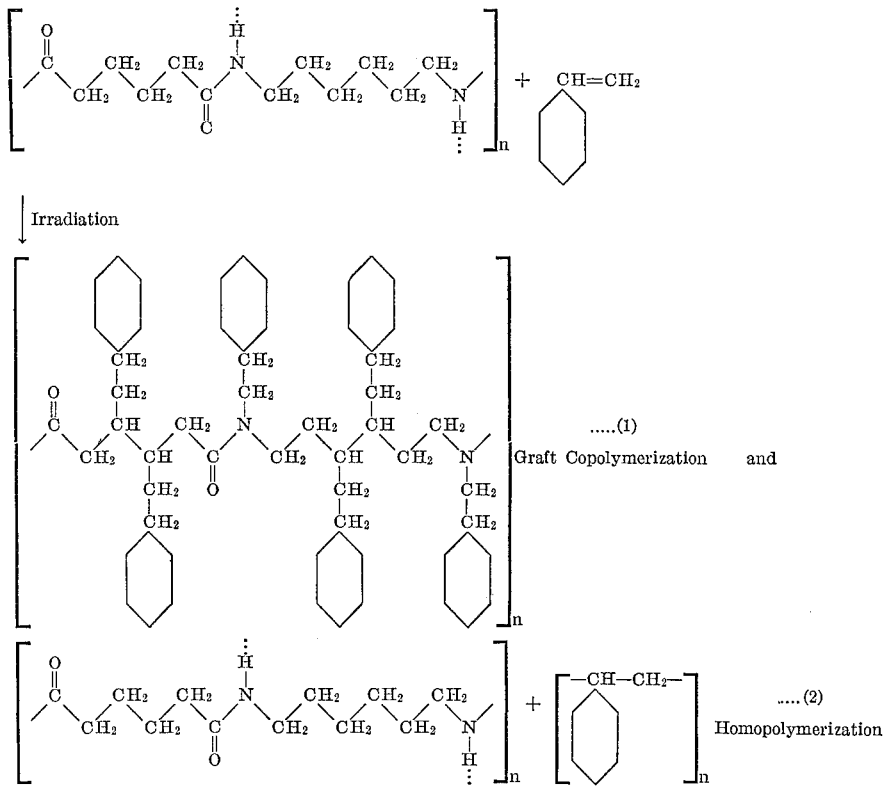

It is generally not possible to control reaction conditions so that only reaction No. 1 occurs. Consequently, the homopolymer that is formed must be removed. The process for the extraction of homopolymers usually takes the form of an extraction with an organic solvent such as benzene, for a period of up to 4 or more hours. This procedure is obviously time consuming and adds considerably to the cost of treating the material.

Furthermore, radiation of this type of polymer is very inefficient with respect to use of high energy radiation. Much of the resulting radiation is generally wasted since the material to be irradiated is very thin. Previous workers experimenting with irradiation of polymers of this type in the form of rolls of material have generally not met with success since among other things, the high energy radiation was not sufficiently penetrating in nature. However, it is clear that it would be more convenient to carry out the grafting process on these materials in the form of rolls instead of sheets. Thus, the material would be more easily handled and the radiation would be more efficiently employed.

The present invention therefore provides a process for the gamma radiation induced graft copolymerization of vinyl or vinylidene monomer contained in an aqueous alcohol solution and polymeric material. It is useful in connection with the copolymerization of vinyl or vinylidene monomers with polymeric material in the form of fabrics, sheets, filaments and threads, which are difficult to irradiate because of their dimensional characteristics. It is also particularly useful in connection with materials of this type in processes in which the copolymerization is accompanied by undesired homopolymerization of the monomer.

The present process comprises reacting a vinyl or vinylidene monomer contained in an aqueous alcohol solution with linear shaped articles of polymeric material with the use of gamma radiation, the polymeric material being in the form of a porous unit consisting of a multiplicity of layers of the linear shaped article. The porous unit may be a stack, or preferably a roll.

In the case of processes resulting in the production of homopolymers as an undesirable by-product, an extraction step is necessary for the removal of the homopolymers as discussed previously. However, it has generally been found that the body of the roll contains negligible amounts of homopolymer, and that the homopolymer is concentrated in the outer layer or layers which were in contact with the bulk of the monomer solution. Thus, the present invention may comprise the additional step of removing the outer layer or layers of the roll containing the major part of the homopolymers to yield a roll of copolymer material containing relatively little homopolymer.

The outer layer or layers of the roll may be composed of the same material as the bulk of the roll and may be integral therewith. In this case, the outer layer or layers of the roll can be discarded and thus no process for the extraction of homopolymers will be necessary. Alternatively, the outer layers of the roll which are removed can be extracted separately and then used. Thus, by far the major part of the roll will not need any extraction for the removal of homopolymer.

On the other hand, the outer layer of the roll can be composed of different, and advantageously cheaper, material which will be discarded after the grafting process is completed. This will again yield a roll of copolymerized material with relatively little or no homopolymer. obviating the necessity for a separate homopolymer extraction process.

The polymeric material in roll form can advantageously by nylon fabric, filament or thread, cotton fabric or thread, other forms of cellulosic material such as paper, burlap, hemp, jute, acetate and rayon or any such natural or synthetic polymeric material including various forms of polyesters, polypropylene and acrylics.

The monomer can advantageously be any vinyl or vinylidene monomer such as styrene, vinyl acetate, vinyl crotonate, acrylate, methacrylate, methylmethacrylate, acrylonitrile, acrylamide, vinyl propionate, vinyl butyrate, vinyl-2-ethylhexoate, divinyl sulphone, or acrylic acid.

In the present development work simultaneous irradiation techniques were employed for grafting. However, any suitable technique may be utilized. Typical experimental procedures followed are given in the following examples:

EXAMPLE 1

Strips of nylon fabric 4½ yards long and 5.5 inches wide were rolled firmly on to ½" diameter metallic rods. The rods were soaked at room temperature in monomer solution of the following composition:

|  | Percent |
|---|---|
| Denatured alcohol | 65 |
| Styrene | 20 |
| Water | 15 |

The styrene used was of technical grade and contained one to 10 p.p.m. of para-tertiary butyl catechol as the inhibitor. As was found by experiment no benefit was observed by removing the inhibitor. The solvent used for the styrene is an aqueous lower aliphatic alcohol, such as methanol or ethanol. A mixture of these in the form of denatured alcohol is the preferred solvent for its efficiency and low cost.

In the grafting experiments, it was observed that, if absolute alcohol was used as a solvent for styrene, the percentage weight increase of the nylon samples due to grafting was very small. The presence of water in the reaction mixture has a very marked and favorable effect on the grafting process.

In soaking the rolls, careful attention was paid to the removal of all air bubbles. This was generally accomplished by careful and complete immersion of the roll in monomer solution. In some cases partial evacuation of the air space over the solution, or vibration of the roll, may be helpful. The denatured alcohol employed consisted of 85% ethanol and 15% methanol. The rolls were then irradiated to various levels in the range of $3.5 \times 10^5$ to $1.2 \times 10^6$ rads in the Atomic Energy of Canada Ltd. "Gammacell 220" Cobalt 60 irradiator (Gammacell is a registered trademark). The dose rate employed was $1.1 \times 10^6$ rads per hour. After irradiation they were aged for 1½ hours, dried, weighed and extracted with benzene. Infrared spectrophotometric techniques were used to check for the removal of homopolymers and for the uniformity of grafting by taking samples from various places in the roll. The results of the experiments are shown in Table I below.

TABLE I

Grafting of styrene on rolls of nylon fabrics

| Dose in Rads: | Percentage weight increase, true graft |
|---|---|
| $3.5 \times 10^5$ | 21.1 |
| $7 \times 10^5$ | 22.4 |
| $1.2 \times 10^6$ | 22.4 |

With 30% styrene+15% water+55% denatured alcohol:

| | |
|---|---|
| $3.5 \times 10^5$ | 36.6 |

The grafted nylon is found to be resistant to chemicals and solvents such as formic acid, phenol, methacresol, unlike the ungrafted nylon fabric which is soluble in all these solvents. The physical properties of grafted nylon are far superior to the original fabric and other surface coated fabrics such as siliconed fabrics as regards tensile strength, water resistance and permeability. Weather-Ometer tests indicated that the grafted fabrics are useful for longer periods than even heavier fabrics like army ducks. This makes the grafted product very valuable for all outdoor uses.

EXAMPLE 2

Procedures similar to those in Example 1 were used for grafting of styrene to cotton, except that the monomer solution had the following composition:

|  | Percent |
|---|---|
| Denatured alcohol | 60 |
| Styrene | 20 |
| Water | 20 |

The results are shown in Table II.

TABLE II.—GRAFTING OF STYRENE ON ROLLS OF COTTON FABRIC

| Percent styrene used in the monomer | Percent denatured alcohol used | Constant percentage weight increase, true graft |
|---|---|---|
| 20 | 60 | 8.76 |
| 40 | 40 | 11.00 |

Grafting was increased by increasing the amount of styrene up to 40%. Higher concentration resulted in the formation of polystyrene in the bulk of the solution and did not increase graft copolymerization.

Great improvements in the properties of the resulting fabric are observed after grafting. Grafted cotton shows marked improvements in crease recovery both wet and dry, resistance to radiation, increased life under severe laundering and inhibition of rotting due to attack by micro-organism.

EXAMPLE 3

The procedures employed in Example 1 were repeated for the grafting of styrene on to rolls of paper. No serious difficulty was encountered in achieving complete soaking of the paper rolls with the monomer solution. The results are shown in Table III.

TABLE III

Grafting of styrene on rolls of paper

| Total dose in rads: | Percentage weight increase due to grafting |
|---|---|
| $2 \times 10^5$ | 3.0 |
| $5 \times 10^5$ | 9.2 |
| $7 \times 10^5$ | 10.5 |

These samples were found to be generally free from homopolymers and the extraction process was unnecessary. Grafting was uniform over the entire length. Significant weight increases due to grafting were achieved with very small doses of radiation; however, relatively little increase was observed with increase of dose beyond $5 \times 10^5$ rads.

EXAMPLE 4

Methylmethacrylate was grafted on to paper using the same technique as shown above with the exception that before irradiation the rolls were soaked in monomer solution at 50° C. instead of at room temperature. The monomer soultion consisted of:

| | Percent |
|---|---|
| Methylmethacrylate | 20 |
| Water | 7 |
| Acetone | 73 |

The results are shown in Table IV.

TABLE IV

Grafting of methylmethacrylate on rolls of paper

| Total dose in rads: | Percentage weight increase due to grafting |
|---|---|
| $2 \times 10^5$ | 6.6 |
| $5 \times 10^5$ | 14.6 |
| $7 \times 10^5$ | 20.3 |

The samples were found to be free from homopolymers and the extraction process was unnecessary. Grafting was uniform over the entire length. Significant weight increases due to grafting could be achieved with very small doses of radiation. The amount of grafting appears to increase linearly.

EXAMPLE 5

The procedures given in Example 4 were repeated for grafting methylmethacrylate on nylon. The results of the experiments are shown in Tables V to VII.

TABLE V

Grafting of methylmethacrylate rolls of nylon fabric

Effect of dose: Dose rate $1 \times 10^6$ rads/hr.

| Monomer concentration: | Percent |
|---|---|
| Water | 10 |
| Methylmethacrylate | 20 |
| Acetone | 70 |

| Dose in rads: | Percentage weight increase due to grafting |
|---|---|
| $5 \times 10^5$ | 27.9 |
| $1 \times 10^6$ | 30.5 |
| $2 \times 10^6$ | 35.8 |

TABLE VI

10% of water kept constant—Total dose: $1 \times 10^6$ rads

| Methylmethacrylate:acetone: | Percentage weight increase due to grafting |
|---|---|
| 10:80 | 9.75 |
| 20:70 | 30.5 |
| 30:60 | 50.5 |
| 50:40 | 92.5 |

TABLE VII

20% methylmehacrylate kept constant—Total dose $1 \times 10^6$ rads

| Water:acetone: | Percentage weight increase due to grafting |
|---|---|
| 5:75 | 23.4 |
| 10:70 | 30.5 |
| 15:65 | 21.8 |
| 25:55 | 20.2 |

It is noted that variations in the composition of the monomer solution affected the grafting considerably. In nylon-methylmethacrylate grafting, the percentage weight increase due to grafting increases linearly with increase in the concentration of methylmethacrylate. The samples are free from homopolymers. Addition of water above 10% gave no benefits. Methylmethacrylate grafted nylon showed increased wet and dry crease recoveries which remained high even after the grafted fabric was treated with alkali and chlorinated solvent.

EXAMPLE 6

This experiment illustrates very clearly that during the radiation induced graft copolymerization of rolls and material homopolymerization takes place only in the outer layer or layers. In this experiment, the dose rate was $1.2 \times 10^6$ rads per hour, supplied by an AECL Gammacell 220 irradiator, and the total dose applied was $3.5 \times 10^5$.

The monomer solution had the following composition:

| | Percent |
|---|---|
| Styrene | 20 |
| Water | 15 |
| Denatured alcohol | 65 |

The material had dimensions of 4½ yards by 5½ inches and was in the form of a roll. After the grafting reaction was completed, the roll was found to have a gross increase in weight of 22.8%. The outer layer of the roll, measuring about 1½ inches long was removed. The roll of material remaining was weighed before and after extraction with benzene for the removal of homopolymers. The weight increase of the roll both before and after extraction was 21.1%. This demonstrates that negligible homopolymerization occurred inside the roll of fabric.

The outer layer measuring 1½ inches long by 5½ inches wide was weighed before and after extraction with benzene for the removal of homopolymerization The weight increase before extraction was 59.8% and after extraction was 45.1%, showing that a considerable amount of homopolymerization occurred in the outer layer.

EXAMPLE 7

Grafting experiments on these materials were conducted as described in Examples 1–5, using an AECL Gammacell 200 irradiator which delivers a radiation dose rate of $10^5$ rads per hour. This dose rate was approximately one-tenth of that used in the previous examples, but the procedures are otherwise as previously described. The results are shown in Tables VIII to X.

TABLE VIII

Grafting of styrene to nylon rolls

| Monomer solution: | Percent |
| --- | --- |
| Denatured alcohol | 65 |
| Water | 15 |
| Styrene | 20 |

| Dose in rads: | Percentage weight increase, true graft |
| --- | --- |
| $1 \times 10^5$ | 19.50 |
| $3.5 \times 10^5$ | 20.00 |

TABLE IX

Grafting of styrene to paper rolls

| Monomer solution: | Percent |
| --- | --- |
| Denatured alcohol | 65 |
| Water | 15 |
| Styrene | 20 |

| Total dose in rads: | Percentage weight increase due to grafting |
| --- | --- |
| $2 \times 10^5$ | 5.0 |
| $5 \times 10^5$ | 15.2 |
| $7 \times 10^5$ | 23.6 |

TABLE X

Grafting of methylmethacrylate to paper rolls

| Monomer solution: | Percent |
| --- | --- |
| Methylmethacrylate | 20 |
| Water | 7 |
| Acetone | 73 |

| Total dose in rads: | Percentage weight increase due to grafting |
| --- | --- |
| $2 \times 10^5$ | 20.3 |
| $5 \times 10^5$ | 42.7 |
| $7 \times 10^5$ | 68.7 |

In most cases, a considerable increase in grafting was observed with the lower dose rate when the total dose was maintained at a given figure. From the information presently available, it appears that the economics of the process favour the lower dose rates.

In the case of paper-styrene and paper-methylmethacrylate grafting for the same total dose the percentage weight increase due to grafting was much higher with a lower dose rate in all cases. The percentage weight increase was over three times with methylmethacrylate as the monomer and 1.6–2.2 times with styrene. With styrene as the monomer, with a low dose rate, the percentage weight increase due to grafting was linear with the total radiation dose. This is not so with higher dose rates where very little change is observed above a dose of $5 \times 10^5$ rads. In the case of methylmethacrylate, the percentage weight increase was found to be linear both with the higher and lower dose rates.

There is some increase in true grafting with a higher total dose of radiation (at any of the dose rates employed). Increases in homopolymers formed with higher doses were found mostly on the outer layer of fabric which came into contact with the bulk of the monomer solution. This was confirmed by wrapping a separate piece of fabric on the outer layer of the roll during grafting and removing it later. The bulk of the homopolymers were found on the outer piece of fabric. The extraction process for the removal of homopolymers can be entirely eliminated if this reaction is carried out on rolled material and the outer layer is discarded.

A careful study of the products of the reactions described herein showed that grafting was very uniform throughout the roll irrespective of the length of the material and the compactness of the rolls. There was no tendency for adjacent surfaces of the material to adhere to each other.

What is claimed is:

1. In the process for graft copolymerizing a vinyl or vinylidene monomer in an aqueous alcohol solution onto a polymeric material in the form of a linear shaped article by the use of gamma radiation, in which process the copolymerization is accompanied by undesirable polymerization of the monomer into a homopolymer, the improvement which comprises polymerizing the linear shaped article of polymeric material in a rolled condition of multiple convolutions with outer convolutions and inner convolutions and thereafter separating the outer convolutions from the inner convolutions to leave the inner convolutions with an insignificant concentration of homopolymer.

2. The process in accordance with claim 1 in which the diffusing is accomplished by immersing said porous unit in an aqueous alcohol solution containing said vinyl or vinylidene monomer.

3. The process of claim 2 wherein the alcohol solvent is denatured alcohol.

4. The process of claim 3 wherein water is present in an amount of 7–20% by volume.

5. The process of claim 2 wherein the polymeric material is in the form of a roll of the linear shaped article.

6. A process as in claim 2 in which the vinyl or vinylidene monomer is selected from the group consisting of styrene, vinyl acetate, vinyl crotonate, acrylate, methacrylate, methylmethacrylate, acrylonitrile, acrylamide, vinyl propionate, vinyl butyrate, vinyl-2-ethylhexoate, divinyl sulphone and acrylic acid.

7. The process of claim 5 wherein the vinyl or vinylidene monomer is selected from the group consisting of styrene, vinyl acetate, vinyl crotonate, acrylate, methacrylate, methylmethacrylate, acrylonitrile, acrylamide, vinyl propionate, vinyl butyrate, vinyl-2-ethylhexoate, divinyl sulfone and acrylic acid.

8. The process of claim 5 in which the polymeric material is nylon, linen, burlap, hemp, jute, acetate, rayon, cotton or paper.

9. The process of claim 5 wherein the gamma radiation is employed at a dose rate of $10^4$ to $10^6$ rads per hour.

10. The process of claim 9 wherein the polymer is nylon in the form of a fabric and the monomer is styrene.

11. The process of claim 9 wherein the polymer is cotton in the form of fabric and the monomer is styrene.

12. The process of claim 9 wherein the polymer is paper and the monomer is styrene.

13. The process of claim 9 wherein the polymer is paper and the monomer is methyl methacrylate.

14. The process of claim 9 wherein the polymer is nylon in the form of a fabric and the monomer is methyl methacrylate.

15. A process which comprises the following steps:
   (1) covering a linear shaped article of a substrate polymeric material with at least one porous exterior layer of a polymeric material;
   (2) diffusing a vinyl or vinylidene monomer through said porous exterior layer to said substrate material;
   (3) simultaneously, by gamma radiation, graft copolymerizing said monomer onto said subtrate polymeric material and polymerizing said monomer to a homopolymer substantially only in said exterior layer; and
   (4) separating said exterior layer from said substrate polymeric material which substrate has only a negligible concentration of said homopolymer.

16. The process according to claim 15 wherein said substrate polymeric material is different from said exterior polymeric material.

17. The process according to claim 15 including the additional step of extracting the exterior layer for removal of said homopolymer.

References Cited
UNITED STATES PATENTS

| | | | |
|---|---|---|---|
| 3,101,276 | 8/1963 | Hendricks | 204—160.1 |
| 3,109,798 | 11/1963 | Arthur et al. | 204—159.12 |
| 2,998,329 | 8/1961 | Sovish et al. | 117—93 |

FOREIGN PATENTS

| | | |
|---|---|---|
| 1,079,401 | 12/1955 | France. |

OTHER REFERENCES

Chapiro: Radiation Chemistry of Polymeric Systems, Wiley & Sons (1962), pp. 683–684, 686–687.

Chapiro et al.: Direct Radiation Grafting onto Hydrophilic Polymers, International Journal of Applied Radiation and Isotopes, 1960, vol. 8, pp. 164–167.

MURRAY TILLMAN, Primary Examiner

R. B. TURER, Assistant Examiner

U.S. Cl. X.R.

204—159.15, 159.16, 159.17; 260—17.4, 857